(12) United States Patent
Myers

(10) Patent No.: US 9,197,677 B2
(45) Date of Patent: Nov. 24, 2015

(54) MULTI-TIERED SCALABLE MEDIA STREAMING SYSTEMS AND METHODS

(75) Inventor: Robert Linwood Myers, Mississauga (CA)

(73) Assignee: ARRIS Canada, Inc., Toronto, Ontario (CA)

(*) Notice: Subject to any disclaimer, the term of this patent is extended or adjusted under 35 U.S.C. 154(b) by 354 days.

(21) Appl. No.: 12/400,270

(22) Filed: Mar. 9, 2009

(65) Prior Publication Data
US 2010/0228862 A1    Sep. 9, 2010

(51) Int. Cl.
G06F 15/16    (2006.01)
G06F 15/173   (2006.01)
H04L 29/06    (2006.01)

(52) U.S. Cl.
CPC .......... H04L 65/105 (2013.01); H04L 65/1069 (2013.01)

(58) Field of Classification Search
CPC ............................ H04L 65/105; H04L 65/1069
USPC .......................................................... 709/227
See application file for complete search history.

(56) References Cited

U.S. PATENT DOCUMENTS

| | | | |
|---|---|---|---|
| 5,920,865 A | 7/1999 | Ariga | |
| 6,240,243 B1* | 5/2001 | Chen et al. | 386/344 |
| 7,028,096 B1 | 4/2006 | Lee | |
| 7,095,782 B1* | 8/2006 | Cohen et al. | 375/240.01 |
| 7,143,170 B2 | 11/2006 | Swildens et al. | |
| 7,194,000 B2 | 3/2007 | Balachandran et al. | |
| 7,359,985 B2 | 4/2008 | Grove et al. | |
| 7,369,610 B2 | 5/2008 | Xu et al. | |
| 7,376,716 B2 | 5/2008 | Dilley et al. | |
| 7,392,325 B2 | 6/2008 | Grove et al. | |
| 7,536,470 B2 | 5/2009 | Li et al. | |
| 2002/0021761 A1* | 2/2002 | Zhang et al. | 375/240.27 |
| 2002/0140851 A1* | 10/2002 | Laksono | 348/388.1 |
| 2003/0195977 A1* | 10/2003 | Liu et al. | 709/231 |
| 2004/0202320 A1* | 10/2004 | Amini et al. | 380/36 |
| 2005/0163224 A1 | 7/2005 | Shin et al. | |
| 2006/0165166 A1 | 7/2006 | Chou et al. | |
| 2006/0248216 A1 | 11/2006 | Park | |
| 2007/0022215 A1 | 1/2007 | Singer et al. | |
| 2007/0121723 A1 | 5/2007 | Mathew et al. | |

(Continued)

OTHER PUBLICATIONS

Co-pending U.S. Appl. No. 12/400,306, "Progressive Download Gateway", filed Mar. 9, 2009.

(Continued)

*Primary Examiner* — June Sison
*Assistant Examiner* — Steven Nguyen
(74) *Attorney, Agent, or Firm* — Stewart M. Wiener

(57) ABSTRACT

Embodiments disclosed herein relate generally to systems and methods for delivering a scalable media stream from a media server to a media client, wherein thinning is performed at more than one location in the network between the media server and the media client. The system includes at least a session management node located close to the media server, and a client management node located close to the media client. The session management node receives the scalable media stream from the media sever and performs steady state thinning on the scalable media stream to produce a session media stream. The client management node receives a client input media stream, which is at least a portion of the scalable media stream, and performs dynamic thinning on the client input media stream to produce a client output media stream that is streamed to the media client.

36 Claims, 7 Drawing Sheets

(56) References Cited

U.S. PATENT DOCUMENTS

| | | | |
|---|---|---|---|
| 2007/0165524 | A1 | 7/2007 | Mascolo |
| 2007/0201549 | A1 | 8/2007 | Hannuksela et al. |
| 2007/0263087 | A1* | 11/2007 | Hong et al. ............... 348/14.13 |
| 2007/0268362 | A1* | 11/2007 | West et al. ............... 348/14.15 |
| 2007/0276954 | A1 | 11/2007 | Chan et al. |
| 2007/0291837 | A1* | 12/2007 | Eleftheriadis ............ 375/240.02 |
| 2008/0095230 | A1 | 4/2008 | Hannuksela et al. |
| 2008/0120424 | A1* | 5/2008 | Deshpande .................. 709/230 |
| 2008/0130658 | A1 | 6/2008 | Chakareski et al. |
| 2008/0211901 | A1 | 9/2008 | Civanlar et al. |
| 2008/0239062 | A1 | 10/2008 | Civanlar et al. |
| 2008/0247460 | A1 | 10/2008 | Kang et al. |
| 2009/0013083 | A9* | 1/2009 | Garcia-Luna-Aceves et al. ............................. 709/229 |
| 2009/0016434 | A1* | 1/2009 | Amonou et al. ......... 375/240.12 |
| 2009/0031021 | A1 | 1/2009 | Bae et al. |
| 2009/0119594 | A1 | 5/2009 | Hannuksela |
| 2009/0178091 | A1 | 7/2009 | Miyamoto et al. |
| 2009/0295988 | A1* | 12/2009 | Kohno .......................... 348/441 |
| 2010/0020866 | A1* | 1/2010 | Marpe et al. ............. 375/240.02 |
| 2010/0228875 | A1 | 9/2010 | Myers |
| 2011/0082945 | A1 | 4/2011 | Myers |

OTHER PUBLICATIONS

Jens-Rainer Ohm, "Scalable Video Coding", In: Shenzhen Workshop, RWTH Aachen University, Oct. 2007, Aachen, Germany.

Heiko Schwarz et al., "Overview of the Scalable Video Coding Extension of the H.264/AVC Standard", In: IEEE Transactions on Circuits and Systems for Video Technology, Sep. 2007, vol. 17, No. 9, Berlin, Germany.

United States Office Action, U.S. Appl. No. 12/400,306, dated Jan. 3, 2012.

U.S. Notice of Allowance dated Mar. 5, 2012, U.S. Appl. No. 12/842,515.

Extended European Search Report dated Nov. 9, 2011 for Application No. 11174626.9-1247.

Alex Zambelli: "IIS Smooth Streaming Technical Overview", Mar. 31, 2009, XP55009366, Retrieved from the Internet: URL: http://img.prodek.It/documents/IIS_Smooth_Streaming_Technical_Overview; pdf [retrieved on Oct. 12, 2011] the whole document.

Thomas Schierl et al. "Response to CfP on HTTP Streaming of MPEG Media—On Adaptive HTTP Streaming using SVC and MVC", 93. MPEG Meeting; Jul. 26, 2010-Jul. 30, 2010; Geneva; (Motion Picture Expert Group or ISO/IEC JTC1/SC29/WG11) No. M17851, Jul. 22, 2010.

Universal Mobile Telecommunications System (UMTS); LTD; Transparent end-to-end Packet-switched Streaming Service (PSS); Protocols and codecs (3GPP TS 26.234 version 9.3.0 Release 9), Technical Specification, European Telecommunications Standards Institute (ETSI), 650, Route Des Lucioles; F06921 Sophia-Antipolis; France, vol. 3GPP SA 4, No. V9.3.0 Jun. 1, 2010, XP014047290, section 12.1, section 12.6.2, p. 109, examples 15 and 16.

Anonymous: "Study of ISO/IEC 14496-10: 2009/DCOR 1", 90. MPEG Meeting; Oct. 26, 2009-Oct. 30, 2009; Xian; (Motion Picture Expert Group or ISO/IEC JTC1/SC29/WG11) No. N10898, Nov. 18, 2009 XP030017397.

Wenger M M Hannuksela T Stockhammer M Westerlund D Singer S: "RTP Payload Format for H.264 Video; rfc3984.txt", 5. JCT-VC Meeting; 96. MPEG Meeting; Mar. 16, 2011-Mar. 23, 2011; Geneva; (Joint Collaborative Team on Video Coding of ISO/IEC JTC1/SC29/WG11and ITU-T SG. 16); URL: http://wftp3.itu.int/av-arch/jc tvc-site/, Internet Engineering Task Force, IETF, CH, Feb. 1, 2005, XP015009755, ISSN: 0000-0003, section 5.5.

Microsoft Corporation: "IIS Smooth Streaming Transport Protocol", Internet Citation, Sep. 8, 2009, pp. 1-55, XP002617721, Retrieved from the Internet: URL: http://www.iis.net/community/files/media/smoothspecs/%5BMS-SMTH%5D.pdf [retrieved on Jan. 21, 2011] section 1.3, section 4.

United States Office Action, U.S. Appl. No. 12/400,306, dated Jul. 19, 2011.

United States Office Action Response, U.S. Appl. No. 12/400,306, dated Oct. 17, 2011.

ISO/IEC 14496-15:2004 Amd 2:2008, "Information technology—Coding of audio-visual objects—Part 15: Advanced Video Coding (AVC) file format".

Co-pending U.S. Appl. No. 12/842,515, "Methods and Systems for Scalable Video Delivery", filed Jul. 23, 2010.

United States Office Action, U.S. Appl. No. 12/400,306, dated Feb. 3, 2011.

United States Office Action Response, U.S. Appl. No. 12/400,306, dated May 3, 2011.

Co-pending U.S. Appl. No. 12/842,474, "Methods and Systems for Scalable Video Chunking", filed Jul. 23, 2010.

ISO/IEC 14496-12:Third Edition Oct. 15, 2008, "Information technology—Coding of audio-visual objects—Part 12: ISO base media file format".

* cited by examiner

MULTI-TIERED SCALABLE MEDIA STREAMING SYSTEMS AND METHODS

FIELD

The described embodiments relate to the field of streaming media, and in particular to streaming of scalable media, such as video and audio.

BACKGROUND

Most modern video transmission systems using the Internet and mobile networks use IP (Internet Protocol) for real-time services, such as conversational and streaming services. Typically, IP networks are comprised of a wide range of connection qualities and receiving devices. The receiving devices typically have a variety of capabilities ranging from cell phones with small screens and restricted processing power to high-end PCs (personal computers) with high definition displays.

To accommodate the varying connection qualities and receiving devices, encoders are typically introduced into the network. An encoder receives the raw video and encodes it into one or more non-scalable formats where each format represents a different quality of video. The higher the quality, the more bandwidth the video requires. Conversely, the lower the quality, the less bandwidth the video requires. The encoded videos are then saved on a media server or on a farm of media servers.

When a media client requests a particular video with a particular quality the appropriate encoded video stream is retrieved from the media server and transmitted to the media client over the IP network. In this manner each media client can receive a different quality of video stream suitable for its needs. For example, a cell phone media client with a small screen is not capable of displaying a high resolution video, therefore it is not worthwhile transmitting a high quality video to the cell phone media client. On the other hand, a high-end PC media client with a high definition display would likely want to receive the highest resolution video possible.

However, encoder-based systems are not designed to dynamically adapt to system changes. Once a non-scalable format is selected for a particular media client, the scalable media format is used for the entire transmission of the video, regardless of any changes in the system. For example, if a user initially requested a high quality video stream, and subsequently the network bandwidth between the media server and the media client is reduced, the media server will not reduce the video quality to accommodate. The media server will continue to send the high quality video which results in a loss of packets and ultimately quality. In addition, encoder based systems do provide the end user with dynamic control of the streaming. For example, the user has no ability to dynamically change the resolution or screen size of the video.

Furthermore, encoder-based systems require the media server or farm of media servers to have sufficient memory to store each video stream in a variety of non-scalable formats.

One way to solve the problems with an encoder-based system is to introduce transcoders in the network between the media server and the media client. The transcoders receive the encoded video stream from the media server and convert the encoded video stream into another non-scalable format based on a variety of factors including the condition of the network between the transcoder and the media client. The conversion typically involves decoding of the original video stream from the media server, and recoding of the decoded video stream using other parameters.

However, not only are transcoders generally quite expensive on a per port basis, but the conversion usually causes a time delay and degradation of the video quality.

To address at least some of the problems with the previous video transmission systems, a new video coding standard, referred to as Scalable Video Coding (SVC) was developed. SVC is an extension of the H.264/MPEG-4 AVC video compression standard. When a raw video stream is SVC encoded, it is encoded into one or more streams or layers, of differing quality. The layer with the lowest quality, referred to as the base layer, contains the most important part of the video stream. One or more enhancement layers may then be encoded to further refine the quality of the base layer. The enhancement layers are used for improving the spatial resolution (picture size), temporal resolution (frame rate), and the SNR (signal to noise ratio) quality of the base layer.

SUMMARY

Embodiments disclosed herein relate generally to systems and methods for streaming a scalable media stream from a media server to a media client, wherein thinning is performed on the scalable media stream at more than one location in the network between the media server and the media client.

In one broad aspect, there is provided a system for streaming a scalable media stream from a media server to a media client over a network. The system comprises: (a) a session management node connected to the network, the session management node for: (i) receiving the scalable media stream from the media server, and (ii) performing steady state thinning on the scalable media stream to produce a session media stream; and (b) a remote client management node connected to the network, the client management node for: (i) receiving a client input media stream, the client input media stream being at least a portion of the session media stream, (ii) performing dynamic thinning on the client input media stream to produce a client output media stream, the dynamic thinning being responsive to changes in network conditions between the client management node and the media client, and (iii) transmitting the client output media stream to the media client.

In another broad aspect, there is provided a method for streaming a scalable media stream from a media server to a media client over a network. The method comprises: (a) receiving a request from the media client for the scalable media stream at a client management node; (b) transmitting the request from the client management node to a session management node; (c) receiving the request at the session management node; (d) transmitting the request from the session management node to the media server; (e) receiving the scalable media stream at the session management node in response to the request in (d); (f) performing steady state thinning of the scalable media stream to produce a session media stream using the session management node; (g) receiving a client input media stream at the client management node, the client input media stream being at least a portion of the session media stream; (h) performing dynamic thinning on the client input media stream to produce a client output media stream using the client management node; and (i) transmitting the client output media stream from the client management node to the media client.

Further aspects and advantages of the embodiments described herein will appear from the following description taken together with the accompanying drawings.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

Figure 1:
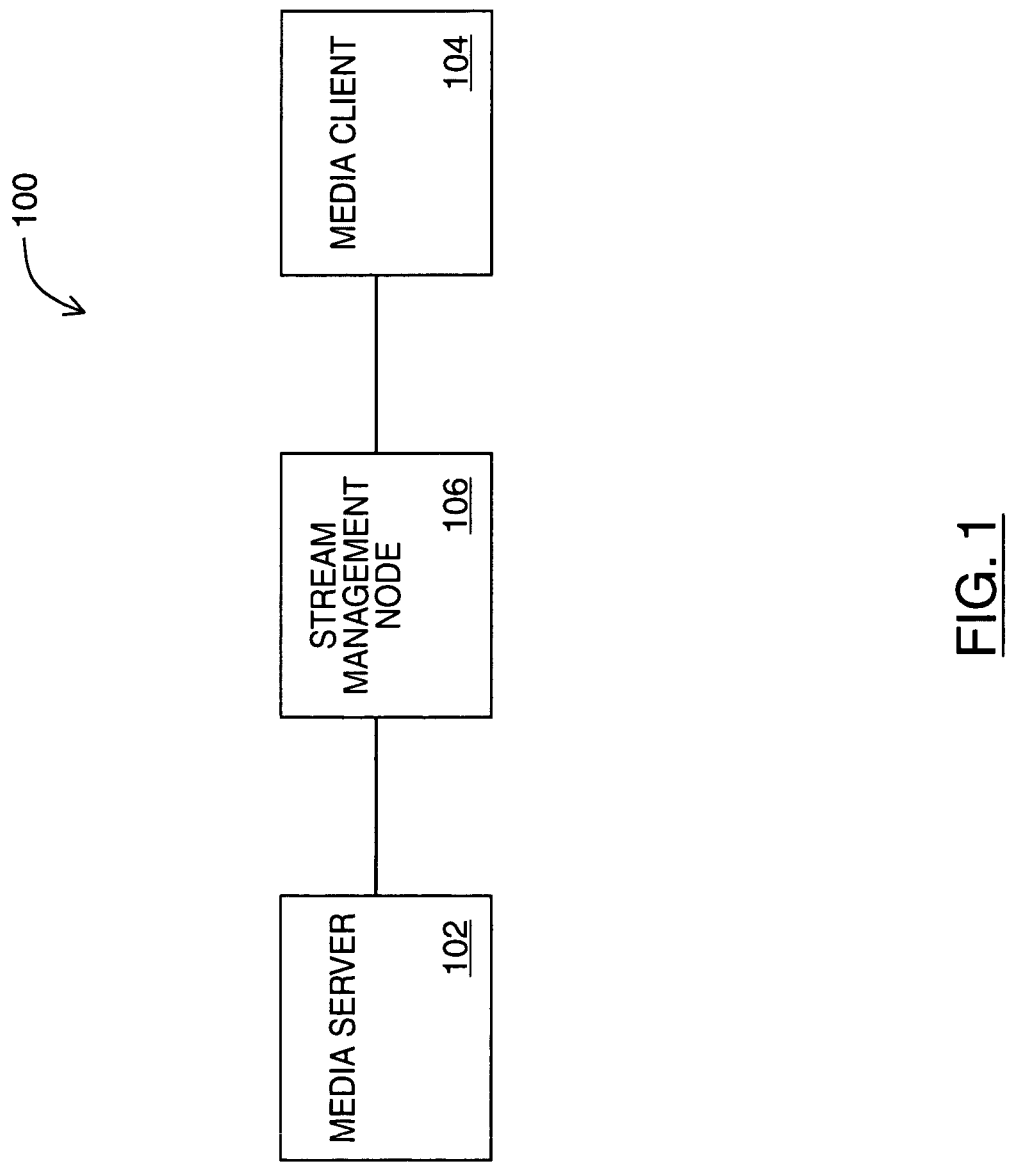
FIG. 1 is a block diagram of a system for streaming a scalable media stream from a media server to a media client.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), at least one input device, and at least one output device. For example and without limitation, the programmable computers may be a personal computer or laptop. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Furthermore, the systems and methods of the described embodiments are capable of being distributed in a computer program product comprising a physical computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Reference is now made to FIG. 1, in which a system 100 for streaming a scalable media stream from a media server 102 to a media client 104 in accordance with at least one embodiment is illustrated. In the embodiment shown in FIG. 1, the system 100 includes the media server 102, the media client 104 and a stream management node 106 situated between the media server 102 and the media client 104. In other embodiments, the functions performed by the stream management node 106 may be performed by the media server 102 itself.

The media server 102 holds one or more scalable media streams that may be streamed to the media client 104 upon request via the stream management node 106. The one or more scalable media streams may be scalable video streams encoded using SVC, or any other scalable media streams such as scalable audio streams, and scalable video streams encoded using any other standard. A media stream is considered to be scalable when parts of the stream can be removed in a way that the resulting substream forms another valid media stream for a receiving device, and the substream is a lower quality representation of the original media content than that of the complete media stream. Non-scalable media streams are often referred to as single-layer media streams.

The media server 102 may be implemented by the use of one or more general purpose computers, such as, for example, a Sun Microsystems™ F15K server.

The media client 104 typically includes a web browser and a media player. A web browser is a software application which enables a user to display and interact with text, images, video, music, game and other information located on a Web page at a website on the Internet or on a local network (e.g. a local area network (LAN)). The web browser interacts with the media server 102 to download specific media content, such as video and audio. The web browser may be any well known web browser such as Internet Explorer™, Mozilla Firefox™, Safari™ or the like.

A media player is software for playing back media files. Most media players support an array of media formats, including both audio and video files. The media player is typically integrated with the web browser to play or display any downloaded or streamed media files. The media player may be any well known media player such as Windows Media Player™ or Quicktime™.

The media client 104 may be implemented by the use of one or more general purpose computers, such as, for example, a typical personal computer manufactured by Dell™, Gateway™, or Hewlett-Packard™. Those skilled in the art will understand that the media client 104 may be a game console, a portable gaming device, a laptop computer, a personal digital assistant (PDA), a mobile phone, a set top box, or an interactive television.

The stream management node 106 acts as a proxy between the media client 104 and the media server 102. Accordingly, all communication between the media client 104 and the media server 102 passes through the stream management node 106.

In some embodiments, the stream management node 106 acts as a HTTP (Hypertext Transfer Protocol) or web proxy. In other embodiments, the stream management node 106 acts as an RTP (Real Time Protocol)/RTSP (Real Time Streaming Protocol) proxy. RTSP is a protocol for use in streaming media, which allows a client to remotely control a streaming media server, issuing VCR-like commands such as "play" and "pause", and allowing time-based access to files on a media server. The sending of streaming data itself is not part of the RTSP protocol. Most RTSP systems use RTP as the transport for the actual audio/video data.

As a reverse RTSP proxy, the stream management node 106 acts as a media server to the media client 104, and as a media client to the media server 102. Specifically, the stream management node 106 receives RTSP requests from the media client 104 for a particular scalable media stream and then forwards them to the media server 102.

When the stream management node 106 services more than one media client 104, the stream management node 106 may keep a session record for each request. The session records keep track of the requests to ensure that when a response from the media server 102 is received, the response can be forwarded to the appropriate media client 104. In addition, once the media server 102 starts streaming the scalable media stream, the session records enable the stream management node 106 to forward the scalable media stream packets (i.e. RTP packets) from the media server 102 to the appropriate media client 104.

In these embodiments there are typically two sessions per request. There is a session between media client 104 and the stream management node 106 and a session between the stream management node 106 and the media server 102. Each session record typically contains all of the information required by the stream management node 106 to link packets to a particular session. Initially, the session record typically includes a unique session ID, the IP address and TCP port of the media client 104, the IP address of the media server 102 and the RTSP TCP Port of the stream management node 106.

As the session progresses, UDP ports are typically identified for the transmission of the scalable media stream. Accordingly, the following is typically added to the session record after the session is established: the RTP and RTCP ports for the session between the media server 102 and the stream management node 106, and the RTP and RTCP ports for the session between the stream management node 106 and the media client 104.

The session records may be stored in a memory table or a database.

In addition to acting as a proxy between the media client 104 and the media server 102, the stream management node 106 performs stream management on the scalable media stream. Stream management typically includes thinning and policing of the scalable media stream. Thinning is the process of intentionally removing specific packets from a scalable media stream. Thinning typically involves receiving a scalable media stream packet from the media server 102, analyzing the headers of the packet, and deciding to either drop the packet or forward it to the media client 104 based on at least the information in the headers.

An SVC encoded video stream is organized into NAL (Network Abstraction Layer) units, and therefore thinning an SVC encoded video stream typically involves analyzing the NAL header to determine what layer the packet belongs to.

Figure 2:
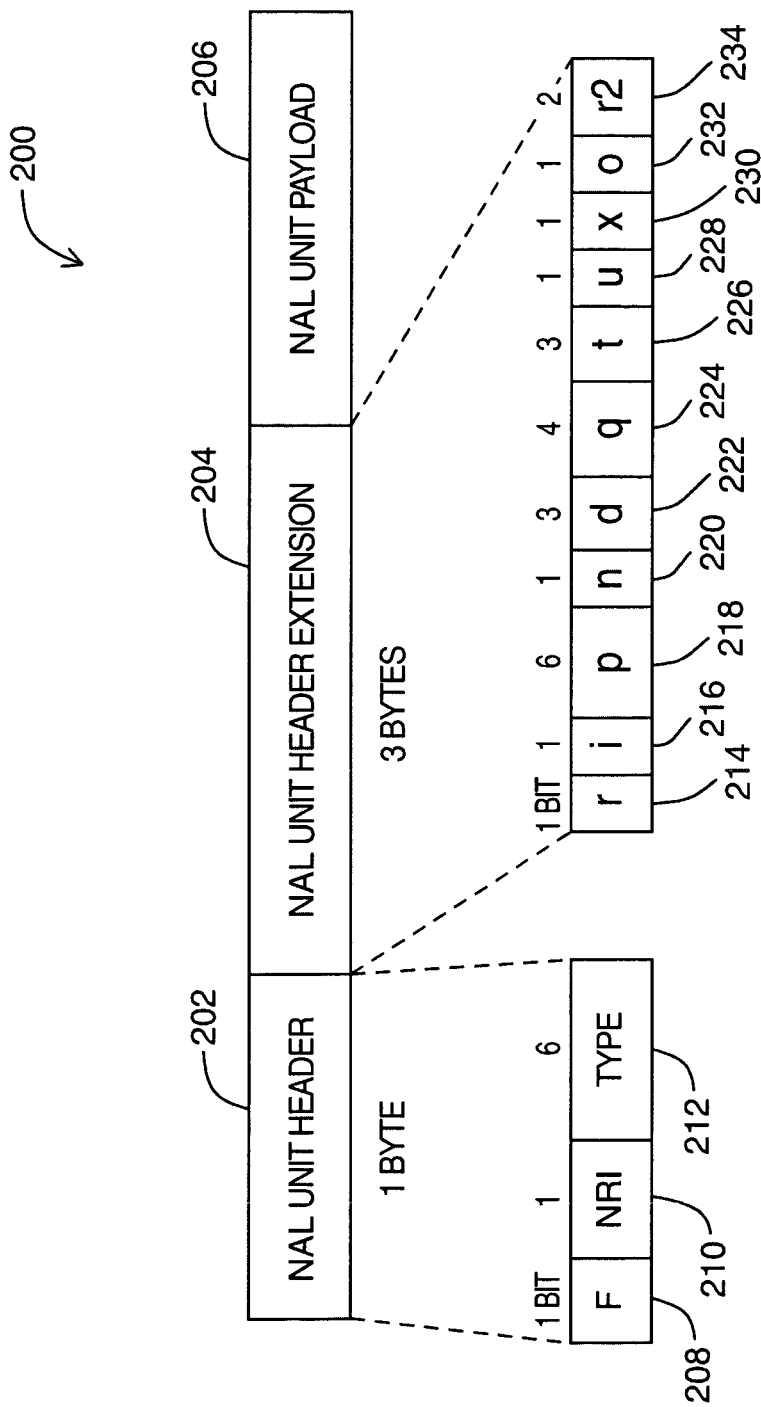
FIG. 2 is a block diagram of a NAL unit.

Reference is now made to FIG. 2, in which an SVC NAL unit 200 is illustrated. The SVC NAL 200 unit is divided into three segments, a one-byte NAL unit header 202, a three-byte SVC NAL unit header extension 204, and a variable length NAL unit payload 206.

The NAL unit header 202 is divided into three segments: a one-bit forbidden segment 208, a two bit NAL reference identification segment 210, and a five-bit NAL unit type 212. The forbidden segment 208 is typically set to 0. Setting the forbidden bit to 1 is declared a violation. The NAL reference identification segment 210 indicates whether NAL is required to maintain the reference picture. The NAL unit type 212 indicates the NAL type. Setting the NAL unit type 212 to 14, 15 or 20 indicates that the NAL unit is an SVC NAL unit.

The SVC NAL unit header extension 204 is divided into eleven segments: a one-bit first reserved segment 214, a one-bit instantaneous decoding refresh segment 216, a six-bit priority segment 218, a one-bit inter-layer prediction segment 220, a three-bit dependency segment 222, a four-bit quality segment 224, a three-bit temporal segment 226, a one bit use-base prediction flag segment 228, a one-bit discardable flag segment 230, a one-bit output flag segment 232, and a two-bit second reserved segment 234.

The first and second reserve segments 214 and 234 have fixed values. For example, the second reserve segment 234 has a fixed value of 11. The instantaneous decoding refresh segment 216 identifies whether the layer representation is an instantaneous decoding refresh (IDR) layer. An IDR layer frame is a frame that does not depend on other frames to decode the entire frame. Setting the instantaneous decoding refresh segment 216 to 1 indicates it is an IDR layer and setting the instantaneous decoding refresh segment 216 to 0 indicates it is not an IDR layer. The priority segment 218 specifies the priority of the NAL unit 200. The inter-layer prediction segment 220 indicates whether inter-layer prediction is used.

The dependency segment 222 indicates a layer with separate SPS (sequence parameter sets). It also indicates a spatial or CGS (coarse-grained scalability) layer. The quality segment 224 indicates the quality of the refinement layer. The temporal segment 226 indicates the temporal resolution. The use-base prediction flag segment 228 indicates use-base representation of reference pictures for motion-compensated prediction. The discardable flag segment 230 is used to indicate that the NAL unit is not required for decoding higher layers. The output flag segment 232 specifies whether the decoded picture is output.

The NAL unit payload 206 contains the scalable media stream data.

Thinning an SVC encoded video stream typically involves analyzing the dependency, quality and temporal segments 222, 224, and 226 of the SVC NAL unit header extension 204. However, other fields may also be taken into account.

Referring back to FIG. 1, the method of selecting which packets of an SVC encoded video stream to drop and which to forward is quite complex and takes into account a number of parameters. The method can be explained at a basic level as follows. The layers of the video stream define a three-dimensional matrix of temporal scaling, resolution scaling and quality (SNR) scaling. The goal of the thinning process is to determine the appropriate operational spot (i.e. the resolution, frame rate, and quality level) on the matrix for a particular media client 104 and remove or drop packets representing layers above the operational spot.

Thinning allows scalable media streams to be tailored to the media client 104 by delivering scalable media streams with different resolutions, frame rates and quality to different media clients 104. Thinning has the effect of changing the bandwidth requirements of a media stream. As a result, thinning can be used to either adjust to a decrease in available bandwidth, or take advantage of an increase in available bandwidth.

There are generally two types of thinning that can be performed: steady state thinning and dynamic thinning. Steady state thinning is the process of thinning a scalable media stream to meet the requirements of a media session during a steady state. Steady state thinning typically involves thinning the scalable media stream to achieve the steady state operational spot (i.e. the resolution, frame rate and quality level) on the three-dimensional matrix.

The steady state operational spot may be selected based on the initial bandwidth between the stream management node 106 and the media client 104; the resolution, frame rate and quality level requested by the media client 104; the profile of the media client 104; and defined policies.

In some cases, the stream management node 106 may be able to determine the available bandwidth between the media client 104 and the stream management node 106 before the media session starts. Specifically, some media clients 104 support proprietary protocols to assist in determining the start-up bandwidth. For example, many Microsoft™ media clients 104 support the concept of sending a well-defined "Packet-Pair" to the media client 104 before it receives the scalable media stream (e.g. scalable video stream). By leveraging well-known information about those packets, the media client 104 can estimate the receiving bandwidth. Similarly, Adobe™ has implemented an Action Script service that provides for a similar model of determining the bandwidth before streaming the scalable media stream.

These mechanisms may be used as input to the initial session setup messages exchanged between the media server 102 and the media client 104. For example, the initial setup may involve an RTSP/SDP (Session Description Protocol) exchange between the media server 102 and the media client 104. Since all packets between the media server 102 and the media client 104 flow through the stream management node 106, the stream management node 106 can retrieve this information from the initial setup message exchange. In other cases, these mechanisms may provide means to present this information directly to the stream management node 106.

Alternatively, the stream management node 106 may start off by sending the media client 104 the highest quality scalable media stream, and reducing the quality as it learns about the bandwidth between the stream management node 106 and the media client 104. For example, once streaming has started there are well-known network feedback mechanisms that can help determine the bandwidth between the stream management node 106 and the media client 104.

Typically the media client 104 will specify the resolution, frame rate and quality level it wishes to receive during the initial setup of the media session. For example, where the scalable media stream is streamed using the RTSP/RTP protocols, the information for the layers is provided to the media client 104 in advance of the scalable media stream. Specifically, the media client 104 will send an initial RTSP Describe message to the media server 102, and as part of the response, the media server 102 will provide the media client 104 with an RTSP/SDP message that defines the parameters for each layer. The media client 102 then has the opportunity to specify which layers it wishes to receive.

In addition, during the initial session setup, the stream management node 106 may acquire information about the media client 104 system limitations that may affect its ability to receive or display scalable media streams. For example, an RTSP Describe message typically include a "user agent" field that may contain information on the media player and operating system being used by the media client 104. This information can be used to determine the capabilities of the media client 104 which can in turn be used to determine the steady state operational spot.

The steady state operational spot may also be selected based on predefined policies. The policies may control, for example, one or more of the following: the maximum quality, the maximum number of concurrent sessions, the maximum session bandwidth, the maximum frame rate, and the maximum resolution. The maximum quality would typically be based on the combination of temporal, spatial and quality scalable levels. The maximum number of current sessions would typically control the maximum number of concurrent scalable media sessions handled by a stream management node 106. The maximum session bandwidth would typically specify the maximum bandwidth to be allotted to a particular session.

In some embodiments, the policies are configured and managed on the stream management node 106 itself. In other embodiments, the policies are configured and managed by an external policy management server (not shown), such as a COPS (Common Open Policy Service) server, a RADIUS (Remote Authentication Dial-In User Service) server, or an ICAP (Internet Content Adaptation Protocol) server.

In some cases, a change in the steady state operational spot may be triggered by the client making a change to their configuration. For example, the client may request a change in the resolution or frame rate of a video stream.

In other cases, a change in the steady state operational spot on the matrix may be triggered by an external policy or by an administrator. For example, a user might initially receive a scalable media stream in low quality, but after completing a registration or paying for a service, may be able to receive the remainder of the scalable media stream in high quality.

Dynamic thinning is thinning that (i) adjusts for dynamically changing aspects of a media session (i.e. the network conditions); or (ii) is applied to a group of streams collectively. Dynamic thinning can generally be described as the process of receiving feedback from internal sources (i.e. the stream management node 106 itself) and external sources (i.e. the network) and temporarily adjusting the operational spot to match the current conditions.

Dynamic thinning typically includes thinning that is based on the current network conditions between the stream management node 106 and the media client 104. For example, the stream management node 106 may monitor the current network conditions through mechanisms such as RTCP (RTP Control Protocol) and adjust the thinning to take advantage of increases or decreases in bandwidth between the stream management node 106 and the media client 104.

As defined in RFC 3550, an RTP media client 104 will typically provide periodic reports through RTCP. RTCP provides parameters that assist in determining the current network conditions between the stream management node 106 and the media client 104. For example, an RTCP RR (Receiver Report) includes information on packet loss and inter-arrival jitter. In cases where the stream management node 106 monitors the network conditions through RTCP, the stream management node 106 may be configurable to set, for example, how often the stream management node 106 expects to receive a receiver report (RR) message and/or what percentage of bandwidth between the stream management node 106 and the media client 104 can be used for RR messages.

Other RTCP mechanisms that may be leveraged by the stream management node 106 include RTCP extended reports and Next Application Data Units. RTCP extended reports typically include more information than the base RTCP packets. Particularly, they may provide more information on packet loss and delays. Next Application Data units provide information to determine the status of the buffer on the media client 104.

Dynamic thinning may also include thinning that is based on the current condition of the stream management node 106 itself. For example, the stream management node 106 may have mechanisms to monitor the performance of the stream management node 106 and adjust the thinning to all or groups of scalable media streams. For example, by monitoring the depth of outbound queues the stream management node 106 can anticipate that it may run into situations where it may have to drop packets. Rather than simply dropping random packets from the queue, the stream management node 106 can implement a change to the thinning process on the affected streams to ensure the queue is never full.

Dynamic thinning also typically includes thinning that is based on policies that are applied to groups of sessions. For example, the stream management node 106 may apply a policy that limits the bandwidth applied to a group of sessions. As described above, in some embodiments, the policies may be configured and managed on the stream management node 106 itself. In such embodiments, group-based policies may be implemented on a media stream URL basis. In other embodiments, the policies are configured and managed by an external policy server, such as a COPS server, a RADIUS server, or an ICAP server.

As described above, in addition to performing thinning on the scalable media stream, the stream management node 106 may also perform stream policing. Stream policing can be described as the monitoring and management of the packets of a media stream to ensure the highest quality of experience (QoE). This typically involves taking advantage of layer knowledge to prioritize packets to ensure potentially dropped packets minimize the impact to QoE. Specifically, the different layers of an SVC-encoded video stream may have different priorities and the stream management node 106 may use that information in determining which packets to drop.

Stream policing may include the use of techniques such as rate shaping, quality of service (QoS), and forward error correction (FEC) control. Rate shaping throttles the rate at which packets are transmitted. In some embodiments, the stream management node 106 may be configured with a high-water mark bandwidth, such that if the amount of bandwidth being used for the scalable media stream(s) exceeds this high-water mark, the stream management node 106 may reduce each stream by a predetermined percentage through thinning or it may stop accepting new scalable media stream requests. For example, a bandwidth of 1 Gbps may be assigned for all scalable media streams associated with a particular URL. When the bandwidth used for scalable media stream associated with this URL exceeds 1 Gbps, the stream management node 106 may either throttle back each of the existing scalable media streams or it may not accept any more requests for scalable media streams associated with that URL.

Forward error correction is way of obtaining error control in data transmissions where the sender adds error correction code (e.g. redundant data) to each message. This allows the receiver to detect and correct errors without the need for additional information from the sender. In some embodiments, the stream management node 106 may automatically implement FEC based on the network conditions (i.e. available bandwidth) and/or preconfigured policies. For example, FEC may be automatically implemented when the stream management node 106 detects packet loss in the network. FEC may be applied to some or all of the layers of a scalable media stream. For example, FEC may initially be applied to the base layer only and subsequently applied to additional layers as required.

Quality of service refers to the ability to provide different priority to different packets based on predetermined criteria. For example, in a typical network packets relating to a real-time service, such as voice or video, may be given a higher priority than data packets. In an IP network that supports QoS, packets may include an IP QoS tag that indicates the priority to be given to that packet. The IP QoS tag may be assigned and processed in accordance with a standard protocol such as TOS (type of service) or DSCP (Differentiated Services Code Points). In some embodiments, the stream management node 106 may process a received packet in accordance with its IP QoS tag. In other embodiments, the stream management node 106 may have the ability to retag packets based on predefined policies.

Figure 3:
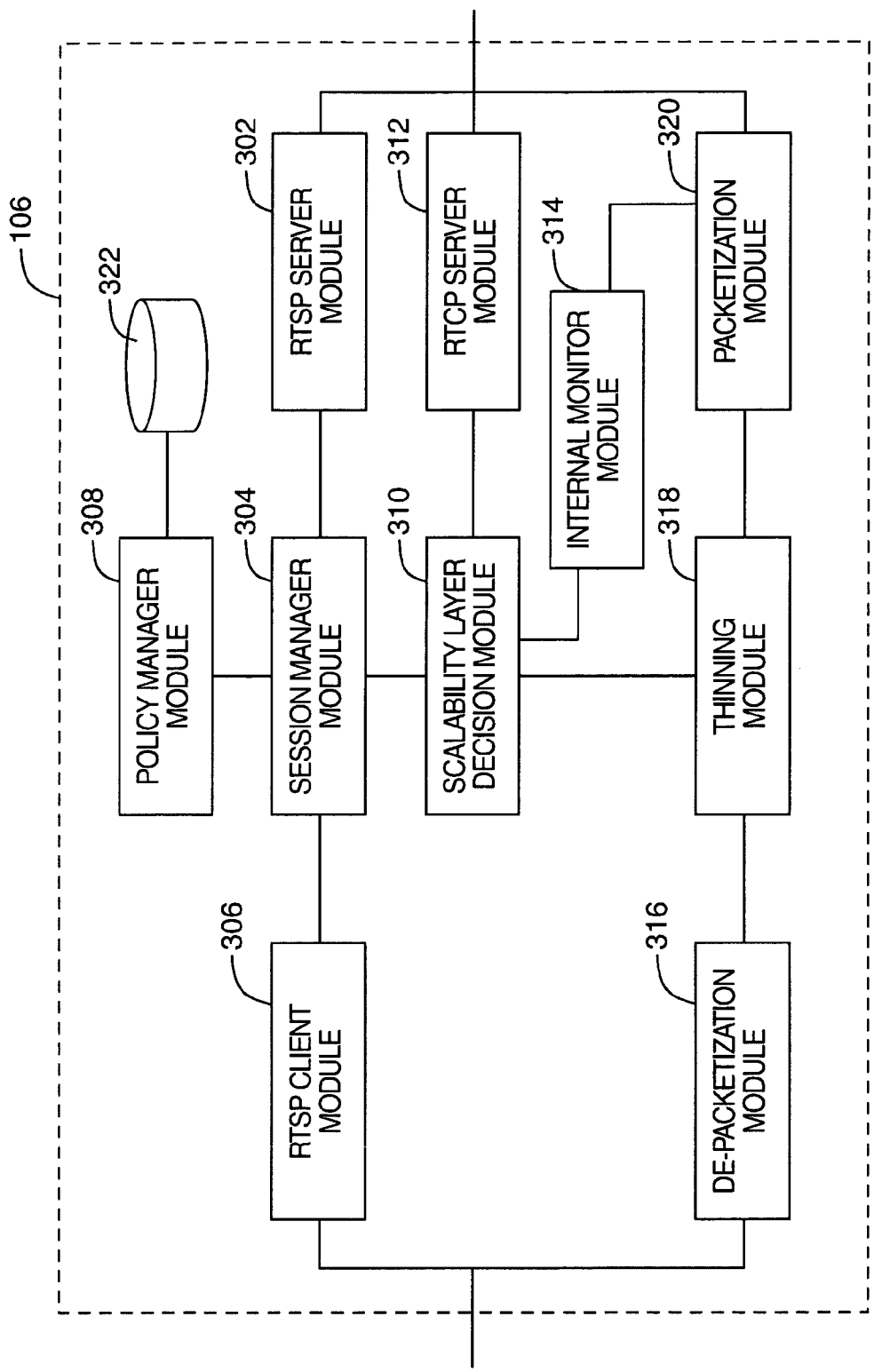
FIG. 3 is a block diagram of the stream management node of FIG. 1 in accordance with at least one embodiment.

Reference is now made to FIG. 3, in which an exemplary embodiment of the stream management node 106 of FIG. 1 is illustrated. In this embodiment the stream management node 106 acts as an RTSP/RTP proxy between the media client 104 and the media server 102, and includes an RTSP server module 302, a session manager module 304, an RTSP client module 306, a policy manager module 308, a scalability layer decision module 310, an RTCP server module 312, an internal monitor module 314, and a de-packetization module 316, a thinning module 318, and a packetization module 320.

The RTSP sever module 302 acts as an RTSP server to the media client 104. Specifically, it receives the initial RTSP Describe message from the media client 104 and sends a Describe event to the session manager module 304. The Describe event provides client connection information (IP address, TCP port, etc.), user agent information and the requested URL. It then waits to receive an SDP event from the session manager module 304 that it will forward to the media client 104 as an SDP message. When the media client 104 responds to the SDP message with an RTSP Setup message the RTSP server module 302 sends a Setup event to the session manager module 304 providing the layer information the client has requested.

The session manager module 304 is responsible for the creation and teardown of the streaming session. When the session manager module 304 receives a Describe event from the RTSP server module 302 it creates a new session record as described above in relation in FIG. 1. The session manager module 304 then sends a Describe event to the RTSP client module. The Describe event typically includes the unique session ID and the requested URL. The Describe event may also include the user agent information.

The session manager module 304 also sends a Query event to the policy manager module 308. The Query event typically includes the session ID, IP address of the media client 102, the user agent information and the requested URL. In response to the Query event the session manager module 304 receives a message from the policy manager module 308 containing any policy information that relates to the media client 102 or the requested URL. For example, the policy information may specify a maximum or minimum bandwidth, resolution, frame rate, etc.

The session manager module 304 will also receive an SDP event from the RTSP client module 306 that typically includes the layer information for the requested scalable media stream. The session manager module 304 may then modify the layer information based on the policy information received from the policy manager module 308 before sending an SDP event to the RTSP server module 302.

The session manager module 304 also generates and sends a Setup event to the scalability layer decision module 310. The Setup event typically includes session information and available layer information.

The RTSP client module 306 acts as an RTSP client to the media server 102. When the RTSP client module 306 receives a Describe event from the session manager module 304, it forwards the Describe event to the media server 102 as an RTSP Describe message. The RTSP client module 306 will typically receive an SDP message from the media server 102 in response to the RTSP Describe message. The RTSP client module 306 will then send an SDP event to the session manager module 304.

The policy manager module 308 is responsible for responding to queries from the session manager module 304 with policy information. It is also responsible for providing an interface to both local and/or remote services that store the policy information. As described above in relation to FIG. 1, the policy information may be stored locally on the stream management node 106, such as on local database 322, or remotely on a policy server, such as on a RADIUS™ or LDAP server.

The scalability layer decision module 310 is responsible for determining the operational spot on the matrix and providing this information to the thinning module 318. The scalability layer decision module 310 may determine the operational spot based on input from the session manager module 304, the RTCP server module 312, and the internal monitoring block 314. Specifically, the session manager module 304 provides information on the available layers, the RTCP server module 312 provides feedback information from the media client 104 such as packet loss and delay, and the internal monitoring block 314 provides information on the health of the stream management node 106. When the scalability layer decision module 310 determines that the operational spot should be changed, it provides that change to the thinning module 318 through an Update event.

The RTCP server module 312 receives RTCP messages from the media client 104 and provides events to the scalability layer decision module based on the messages received. For example, the RTCP server module 312 will typically receive RTCP Receiver Report (RR) messages that inform the stream management node 106 about the quality of service.

The internal monitor module 314 is responsible for monitoring the health and/or performance of the stream management node 106 and providing that information to the scalability layer decision module 310. For example, the internal monitor module 314 may monitor the current depth of the output RTP queue and provide that information either periodically or when it hits a specific configurable depth (i.e. 70% full) to the scalability decision module 310.

The de-packetization module 316 receives the RTP packets from the media server 103 and breaks them down into NAL packets that are forwarded to the thinning module 318.

The thinning module 318 receives the NAL packets from the de-packetization module 316 and performs thinning on the NAL packets based on the current operational spot determined by the scalability layer decision module 310. Thinning was described in detail in relation to FIG. 1. The thinned NAL packets are then forwarded to the packetization module 320.

The packetization module 320 receives the thinned NAL packets from the thinning module 318 and packetizes them into RTP packets and streams them to the media client 104.

In most cases the media server 102 and the media client 104 are in remote locations and are connected by a network that may include one or more private and public networks. If the stream management node 106 is placed close to the media client 104, then network bandwidth may be wasted between the media server 102 and the stream management node 106. Specifically, since the thinning is done near the media client 104, all of the layers of the media stream have to be sent from the media server 102 to the stream management node 106, regardless of whether the media client 104 can process a media stream at the highest quality, or whether there is sufficient network bandwidth to handle such a high quality media stream. If, on the other hand, the stream management node 106 is placed close to the media server 102, the stream management node 106 cannot effectively perform many of the dynamic thinning processes, including dynamic bandwidth management, last mile congestion and error correction.

Accordingly, there is a need for a system that can implement stream management in multiple locations between the media server 102 and the media client 104. Such a system would minimize the amount of network bandwidth used and would be able to effectively implement dynamic thinning services.

Figure 4:
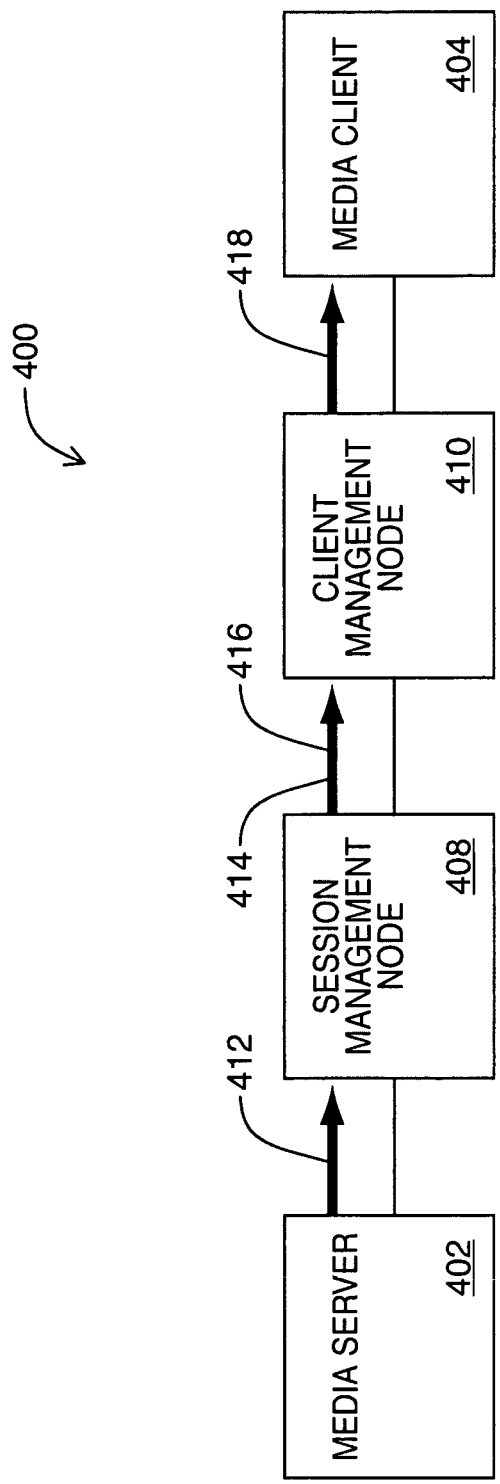
FIG. 4 is a block diagram of a multi-tiered system for streaming a scalable media stream from a media server to a media client in accordance with at least one embodiment.

Reference is now made to FIG. 4 in which a multi-tiered system 400 for streaming a scalable media stream from a media server 402 to a media client 404 in accordance with an embodiment is illustrated. System 400 includes the media server 402, the media client 404, a session management node 408 and a client management node 410. In other embodiments, the session management node 408 may be integrated with the media server 402.

Similar to the media server 102 of FIG. 1, the media server 402 holds one or more scalable media streams that may be streamed to the media client 404 upon request. The one or more scalable media streams may be scalable video streams encoded using SVC, or any other scalable media streams such as scalable audio streams or scalable video streams encoded using any other coding standard.

The session management node 408 and the client management node 410 are types of stream management nodes that each performs at least a portion of the functions of stream management node 106 of FIG. 1. The session management node 408 is situated closer to the media server 402, and the client management node 410 is situated closer to the media client 404.

The session management node 408 receives an input scalable media stream 412 from the media server 402, performs session management services and link management services on the input scalable media stream 412, and outputs a session media stream 414. Session management services can be described as the thinning and policing services described above that are most effectively implemented as close to the media server 402 as possible. Session management services typically include steady state thinning. As described above, steady state thinning typically includes negotiating with the media client 404 to establish the appropriate operational point on the matrix and interaction with a policy server or the like, which identifies policies that are specific to the scalable media stream requested by the media client 404. For example, the policies may specify a maximum resolution allowed.

Link management services can be described as the thinning and policing services described above that are associated with the network conditions between two adjacent stream management devices (e.g. between the session management node 408 and the adjacent client management node 410). Link management services can typically be applied to a group of streams, rather than to an individual stream. For example, the session management node 408 will typically apply the same link management services to all scalable media streams being sent to the client management node 410.

The client management node 410 receives a client input media stream 416, performs client link management services on the client input media stream 416, and outputs a client output media stream 418. In the embodiment shown in FIG. 4, the client input media stream 416 is the same as the session media stream 414. However, in other embodiments the session media stream 414 is further processed or thinned before it reaches the client management node 410 such that the client input media stream 416 is only a portion of the session media stream 414. Client link management services can be described as the thinning and policing services described above in reference to FIG. 1 that are most effectively implemented as close to the media client 404 as possible. Client link management services typically include dynamic thinning that is applied to an individual stream or a group of streams.

In other embodiments, the system may include one or more intermediary management nodes (not shown) situated between the session management node 408 and the client management node 410. An intermediary management node is a stream management node that performs link management services on a scalable media stream. As described above in reference to the session management node 408, link management services are the thinning and policing services that are associated with the network conditions between two stream management devices (e.g. between an intermediary management node and a client management node 410). Intermediary management nodes are usually included in large-scale deployments where the session management node 408 cannot effectively implement link management services due to the size of the network between the session management node 408 and the client management node 410. See FIG. 5 for an example of a system comprising intermediary management nodes.

Figure 5:
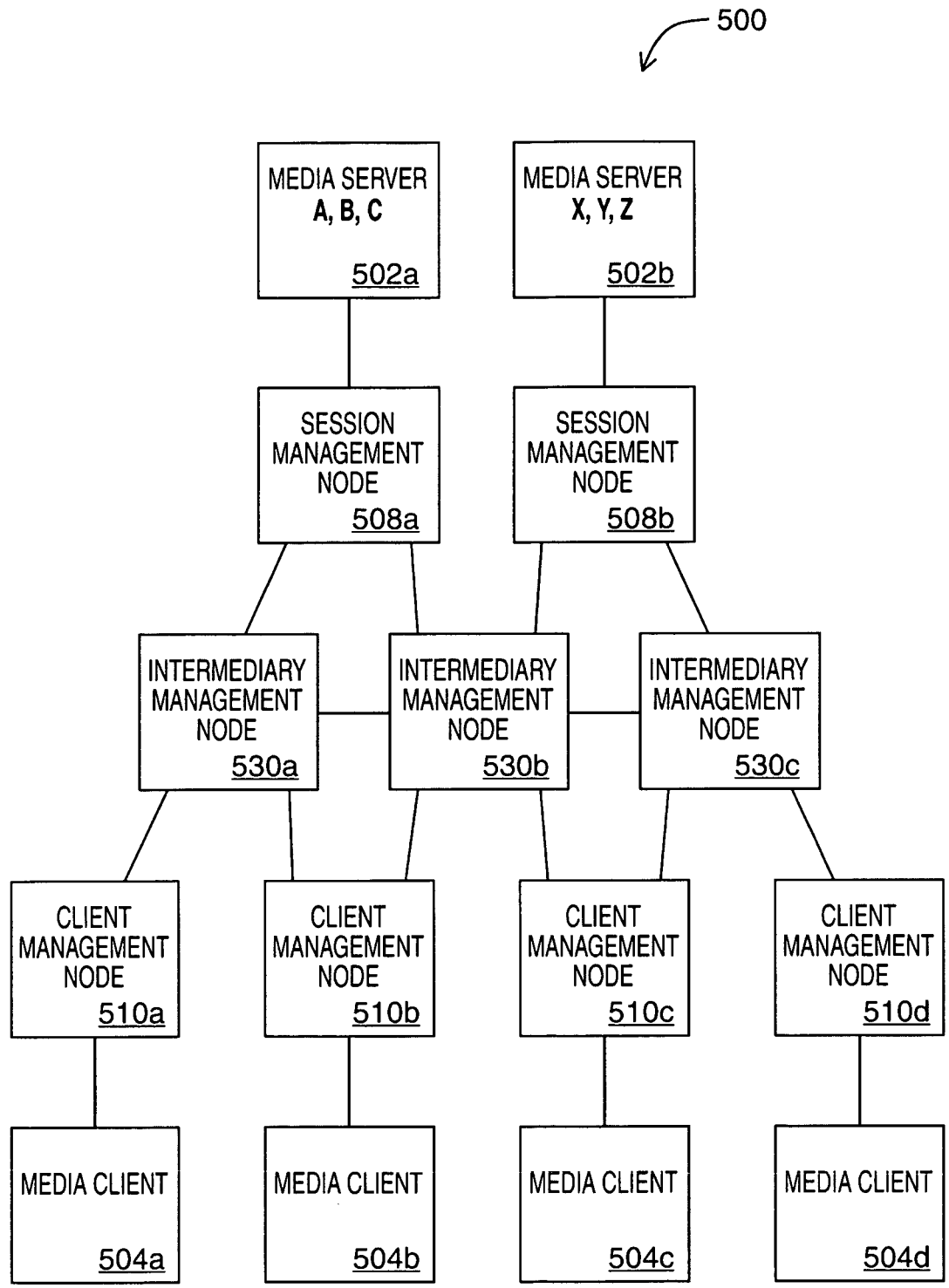
FIG. 5 is a block diagram of a multi-tiered system for streaming a scalable media stream from a media server to a media client in accordance with at least one embodiment.

Reference is now made to FIG. 5 in which a multi-tiered system 500 for streaming scalable media streams from multiple media servers 502a and 502b to multiple media clients 504a, 504b, 504c and 504d in accordance with an embodiment is illustrated. System 500 includes two media servers 502a and 502b, four media clients 504a, 504b, 504c and 504d, two session management nodes 508a and 508b, four client management nodes 510a, 510b, 510c and 510d, and three intermediary management nodes 530a, 530b, 530c. In other embodiments, other suitable combinations of media servers, media clients and stream management nodes (session management nodes, intermediary management nodes, and client management nodes) are possible.

Each of the media servers 502a and 502b holds one or more scalable media streams that may streamed to one or more media clients 504a, 504b, 504c, and 504d upon request. The one or more scalable media streams may be scalable video streams encoded using SVC, or any other type of scalable media streams such as scalable audio streams or scalable video streams encoded using any other coding standard. The media servers 502a and 502b may hold some of the same scalable media streams, all of the same scalable media streams, or none of the same scalable media streams. For example, in the embodiment shown in FIG. 5, the first media server 502a holds media streams A, B and C, and the second media server 502b holds scalable media streams X, Y and Z.

In some embodiments, when a media client 504a, 504b, 504c or 504d wishes to receive a particular scalable media stream, the media client 504a, 504b, 504c or 504d typically uses the URL (Uniform Resource Locator) of the media stream to make a DNS (Domain Name System) query to a DNS server (not shown). The DNS server will reply to the query with one or more IP addresses which correspond to a client management node 510a, 510b, 510c, or 510d. In other embodiments, the media clients 504a, 504b, 504c or 504d are statically configured with one or more client management node IP addresses.

Once the media client 504a, 504b, 504c or 504d has at least one client management node 510a, 510b, 510c, or 510d IP address, it transmits an initial request for the desired scalable media stream to one of the client management nodes 510a, 510b, 510c, or 510d. If the media client 504a, 504b, 504c or 504d does not receive a response from the client management node 510a, 510b, 510c, or 510d within a predetermined time, it will send the initial request to the next client management node in the list. In some embodiments, the initial request may be an RTSP Describe message that contains the URL of the desired scalable media stream. In other embodiments, the initial request may be in an alternate format that contains other scalable media stream identifying information.

In the exemplary embodiment shown in FIG. 5, after making the initial DNS query, each of the media clients 504a, 504b, 504c or 504d receives a single IP address from the DNS sever and sends its initial request to the corresponding client management node. Specifically, the first media client 504a sends its initial request to the first client management node 510a, the second media client 504b is sends its initial request to the second client management node 510b, the third media client 504c sends its initial request to the third client management node 510c, and the fourth media client 504d sends its initial request to the fourth client management node 510d.

Upon receiving the initial request, the client management node 510a, 510b, 510c, or 510d determines which of the stream management nodes it should forward the initial request to.

The process of determining the next stream management node is referred to as the selection of the next hop stream management node. Each subsequent stream management node that receives the initial request will also select the next hop stream management node and forward the initial request to the selected stream management node until the receiving stream management node is a session management node 508a or 508b. Once the initial request reaches a session management node 508a or 508b, the session management node 508a or 508b may use standard mechanisms to forward the initial request to the appropriate media server 502a or 502b. For example, the session management node 508a or 508b may parse the stream identifying information (e.g. the URL) from the initial request (e.g. RTSP Describe message), perform a DNS lookup of the URL to determine the IP address of the media server 502a or 502b, and then forward the initial request (e.g. RTSP Describe message) to the appropriate media server 502a or 502b using the IP address.

In one embodiment, selection of the next hop stream management node is accomplished through static routing. In this embodiment, each stream management node is configured with one routing entry that specifies a single next hop stream management node. Specifically, the selection of the next hop stream management node is predetermined and is not based on the initial request (e.g. the URL of the desired media stream) generated by the media client 504a, 504b, 504c or 504d. In essence, static routing implements a static tree model where all requests received by a particular stream management node are forwarded to a one or more preconfigured stream management nodes.

Static routing can be explained using FIG. 5. If static routing is implemented in system 500, then the second client management node 510b would be configured with one or more default routes, which specifies which stream management node(s) to send any received requests. Consequently, regardless of the specific scalable media stream requested by the second media client 504b, the second client management node 510b will send any request it receives to the configured stream management nodes. So, for example, if the second client management node 510b is configured to send all requests to the first intermediary management node 530a, it will forward all received requests there, regardless of whether or not the requested scalable media stream is situated on the second media server 502b.

One of the problems with static routing is that every session management node (e.g. session management nodes 508a and 508b) in the system has to have access to all the scalable media streams that it will receive a request for. If a session management node does not have access to a particular scalable media stream, it will return an error to the media client 504a, 504b, 504c or 504d. Accordingly, static routing is well suited to a network where all of the media content resides in a single location and the hierarchy is straightforward. For static routing to support multiple media servers with different media streams, the stream management nodes would likely have to be configured with multiple next hop stream management nodes. Configuring the stream management nodes with multiple next hop stream management nodes also increases the availability of the system 500. Specifically, it provides one or more alternate paths to a media server should the primary path be unavailable for any reason.

In another embodiment, selection of the next hop stream management node is accomplished through semi-dynamic routing. In this embodiment, the stream management nodes take advantage of the information in the initial client request (e.g. the URL of the desired media stream) to select the next hop stream management node. Specifically, each stream management node is configured with a static routing table that contains one or more entries that link information in the initial client request (e.g. the URL of the desired media stream) to a next hop stream management node. For example, the second intermediary management node 530a may have two routing entries, one that links the URLs for scalable media streams A, B and C with the first session management node 508a, and one that links the URLs for scalable media streams X, Y and Z with the second intermediary management node 530b. This ensures that any requests for scalable media streams A, B and C are appropriately directed to the first media server 502a, and any requests for scalable media streams X, Y and Z are appropriately directed to the second media server 502b.

In some cases, when an initial client request is received, the receiving stream management node may first determine if there is a routing entry that matches the URL of the desired media stream. If there is a match, the stream management node may send the request to the matching next hop stream management node. If there is no match, the stream management node may determine the IP address or addresses of the destination media server through a DNS (Domain Name System) lookup. The stream management node may then see if there is a routing entry that matches the IP address or IP addresses. If there is a match, the stream management node may forward the request to the matching next hop stream management node. If there is not a match, the stream management node may return an error to the requesting media client 504a, 504b, 504c, or 504d.

Semi-dynamic routing requires, however, that the administrator(s) of the system perform network planning in advance and properly configure each stream management node in the network. Semi-dynamic routing is well suited for static networks (networks that are not dynamically changing) and networks that do not have a large number of distributed media servers or distributed clients.

In still another embodiment, selection of the next hop stream management node is accomplished through fully dynamic routing. In this embodiment, the stream management nodes run a routing protocol that allows the network configuration to be dynamically distributed to all of the stream management nodes in the network. In some cases, the routing protocol is centrally managed and distributes appropriate routing tables to each of the stream management nodes in the network. In other cases, the routing protocol is more akin to network routing protocols such as EIGRP (Enhanced Interior Gateway Routing Protocol), RIP (Routing Information Protocol) or OSPF (Open Shortest Path First), which allow each stream management node to build their own routing table based on information received from its direct neighbors.

Upon receiving an initial request, the media server 502a or 502b generates a response which is typically forwarded through the same path of stream management nodes back to the requesting media client 504a, 504b, 504c, or 504d. In some embodiments the response is an RTSP/SDP (Session Description Protocol) message. Once the media session between the media server 502a or 402b and the media client 504a, 504b, 504c, or 504d has been established, the media server 502a or 502b will begin streaming the scalable media stream to the media client 504a, 504b, 504c, or 504d. In some embodiments, the scalable media stream data is transported through the network via RTP packets.

Once the media server 502a or 502b begins streaming the scalable media stream to the requesting media client 504a, 504b, 504c, or 504d, the stream management nodes (the session management nodes 508a, 508b, the client management nodes 510a, 510b, 510c, 510d, and the intermediary management nodes 530a, 530b, 530c) in the path between the media server 502a or 502b and the media client 504a, 504b, 504c, or 504d, perform the stream management functions on the streamed scalable media stream as described above in reference to FIG. 4. Specifically, the session management node in the path will perform session management services, and link management services on the link between the session management node and the next stream management node in the path (which will be either an intermediary management node or a client management node). Any intermediary management nodes in the path will perform link management services on the link between the intermediary management node and the next stream management node in the path (which will either be an intermediary management node or a client management node). Finally, the client management node will perform client link management services.

Figure 6:
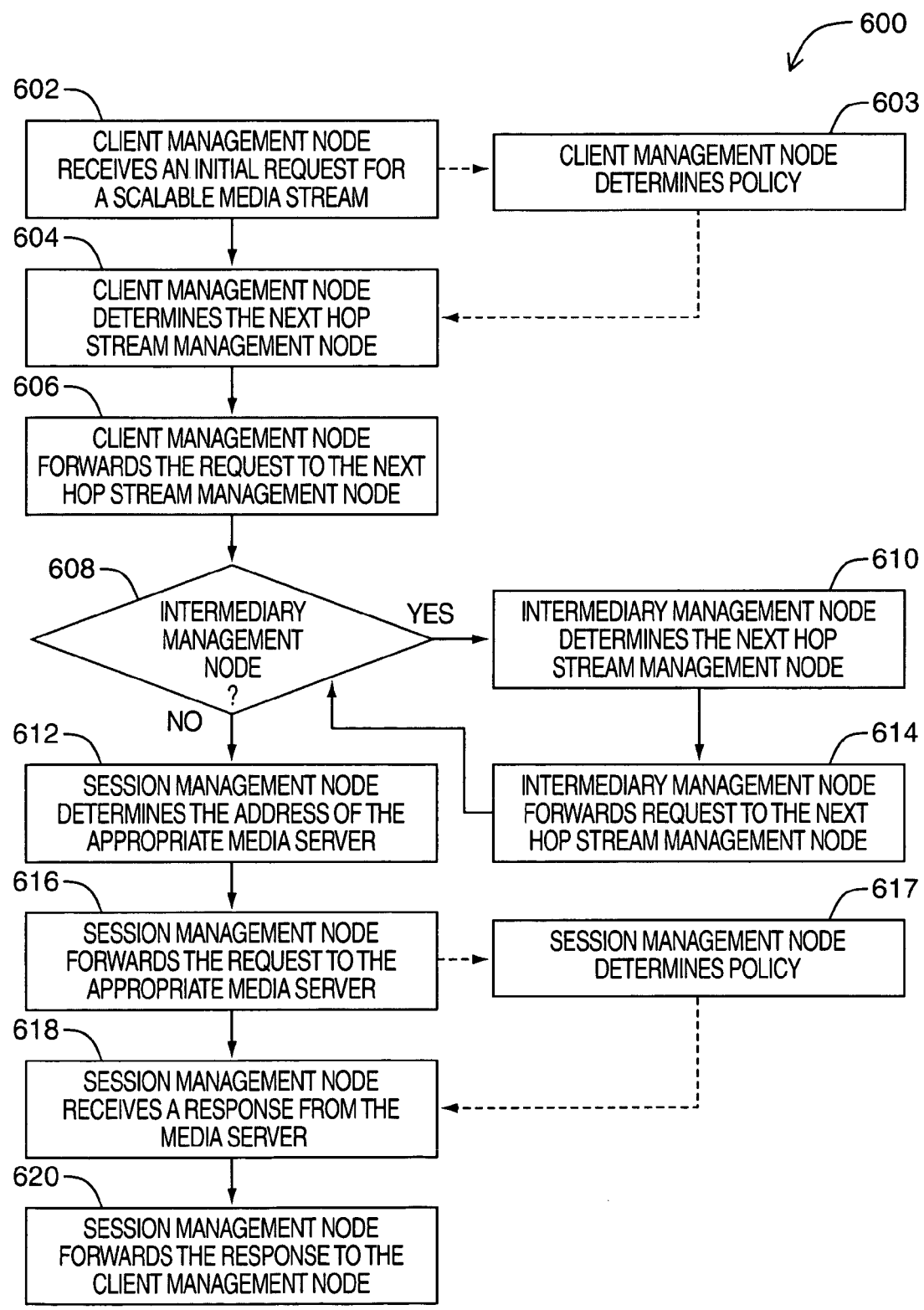
FIG. 6 is a flowchart of a method for setting up a media session between a media server and a media client in accordance with at least one embodiment.

Reference is now made to FIG. 6 in which a method 600 for setting up a media streaming session between a media server and a media client in accordance with at least one embodiment is illustrated. At (602), a client management node (i.e. client management node 510a, 510b, 510c, or 510d) receives an initial request from a media client (i.e. media client 504a, 504b, 504c or 504d) for a particular scalable media stream. In some embodiments the initial request is an RTSP Describe message that includes the URL for the particular scalable media stream. In other embodiments, the initial request is in another format and contains other information (other than the URL) that identifies the scalable media stream.

The method 600 will then proceed to either (603) or (604) depending on whether the system implements policies. If the system implements policies, the method 600 proceeds to (603). Otherwise, the method 600 proceeds to (604).

At (603), the client management node (i.e. client management node 510a, 510b, 510c, or 510d) determines whether there are any policies that apply to this session. Typically, this includes sending a message to the policy manager to retrieve policy information related to the initial request. As described above, the policy information may be stored internally within the client management node, or it may be stored on an external server such as a RADIUS server. Where the information is stored on a RADIUS server, the client management module sends a RADIUS Access Request message to the RADIUS server. The RADIUS Access Request message typically includes the scalable media stream identification information (e.g. the URL of the scalable media stream). The RADIUS server would then analyze the media stream identification information (e.g. the URL of the scalable media stream) and send back any related policy information via a RADIUS Access Accept message. After the policy information is received, the method 600 proceeds to (604).

At (604), the client management node (i.e. client management node 510a, 510b, 510c, or 510d) determines the next hop stream management node. Since any path between a media client (i.e. media client 504a, 504b, 504c or 504d) and a media server (i.e. 502a and 502b) contains only a single client management node (i.e. client management node 510a, 510b, 510c, or 510d), the next hop stream management node will either be an intermediary management node (i.e. intermediary management node 530a, 530b, 530c) or a session management node (i.e. session management node 508a, or 508b).

Where the client management node (i.e. client management node 510a, 510b, 510c, or 510d) implements static routing, determining the next hop stream management node typically involves looking up the single pre-configured next-hop stream management node address. When the client management node implements semi-dynamic or fully dynamic routing, determination of the next stream management node typically involves parsing the initial request (e.g. the RTSP Describe message) to determine the information that identifies the particular scalable media stream (e.g. the URL), and then finding a routing entry that matches the parsed information. If the client management node is unable to find a routing entry that matches the parsed information (e.g. URL), then the client management node will send an error message to the media client (i.e. media client 504a, 504b, 504c or 504d).

At (606), the client management node (i.e. client management node 510a, 510b, 510c, or 510d) forwards the initial request (e.g. RTSP Describe message) to the next hop stream management node determined at (604). In some embodiments, prior to forwarding the initial request, the client management node (i.e. client management node 510a, 510b, 510c, or 510d) may make changes to the initial request (e.g. RTSP Describe message) to act as a proxy between the media client and the media server. Typically, the client management node only changes those aspects of the initial request that identify the media server as the requester, such as the source/sender IP address. The client management node would typically replace all of this information with information identifying the client management node.

At (608), the receiving stream management node determines whether it is configured as an intermediary management node or a session management node. If the receiving stream management node is configured as an intermediary management node, the method proceeds to (610). If the receiving stream management node is configured as a session management node, the method proceeds to (612).

At (610), the intermediary management node (i.e. intermediary management mode 530a, 530b, or 530c) determines the next hop stream management node. Where the intermediary management node implements static routing, determining the next hop stream management node involves looking up the single pre-configured next-hop stream management node address. Where the intermediary management node implements semi-dynamic or fully dynamic routing, determining the next stream management node typically involves parsing the initial request (e.g. the RTSP Describe message) to determine the information that identifies the particular scalable media stream (e.g. the URL), and then finding a routing entry that matches the parsed information. If the intermediary management node (i.e. intermediary management mode 530a, 530b, or 530c) is unable to find a routing entry that matches the parsed information (e.g. URL), then the intermediary management node will send an error message to the media client (i.e. media client 504a, 504b, 504c, or 504d). If the intermediary management node (i.e. intermediary management node 530a, 530b, or 530c) is able to find a matching routing entry, the method 600 then proceeds to (614).

At (614), the intermediary management node (i.e. intermediary management node 530a, 530b, or 530c) forwards the initial request (e.g. RTSP Describe message) to the next hop stream management node determined at (610). The method 600 then proceeds back to (608).

At (612), the session management node (i.e. session management node 508a or 508b) determines the address (e.g. IP address) of the media server (i.e. media server 502a or 502b) housing the requested scalable media stream. In some embodiments, determining the address involves parsing the initial request (e.g. RTSP Describe message) to determine the scalable media stream identifying information (e.g. URL), and then performing a DNS look-up of the identifying information. Once the address (e.g. IP address) of the media server is obtained, the method 600 then proceeds to (616).

At (616), the session management node (i.e. session management node 508a or 508b) uses the address (e.g. IP address) obtained at (612) to forward the initial request (e.g. RTSP Describe message) to the appropriate media server (i.e. media server 502a or 502b). Once the initial request has been forwarded to the appropriate media server (i.e. media server 502a or 502b), the method proceeds to (618).

The method 600 then proceeds to (617) or (618) depending on whether or not policies are implemented in the system. If policies are implemented in the system, the method 600 may proceed to (617), otherwise the method 600 proceeds to (618).

At (617), the session management node (i.e. client management node 508a, or 508b) determines whether or not there are any policies that apply to this session. Typically, this includes sending a message to the policy manager to retrieve policy information related to the initial request. As described above, the policy information may be stored internally within the client management node, or it may be stored on an external server, such as a RADIUS server. Where the information is stored on a RADIUS server, the client management module sends a RADIUS Access Request message to the RADIUS server. The RADIUS Access Request message typically includes the scalable media stream identification information (e.g. the URL of the scalable media stream). The RADIUS server would then analyze the media stream identification information (e.g. the URL of the scalable media stream), and send back any related policy information via a RADIUS Access Accept message. After the policy information is received, the method 600 proceeds to (618).

At (618), the session management node (i.e. session management node 508a or 508b) receives a response from the media server (i.e. media server 502a or 502b). In some embodiments the response is an RTSP/SDP message.

At (620), the session management node (i.e. session management node 508a or 508b) forwards the response back to the client management node (i.e. client management node 510a, 510b, 510c, or 510d) that received the initial request. The client management node then forwards the response to the requesting media client. This establishes the media session between the media server (i.e. media server 502a or 502b) and the media client (i.e. media client 504a, 504b, 504c, or 504d).

Where policies are implemented in the system, the session management node may modify the response prior to forwarding it back to the client management node. For example, where the response is an SDP message, it will typically include layer information for the requested scalable media stream. The session management node may modify the layer information based on the policy information, before sending the SDP message to the client management node.

After the media session has been set-up between the media server (i.e. media server 502a or 502b) and the media client (i.e. media client 504a, 504b, 504c, or 504d), the media server (i.e. media server 502a or 502b) begins streaming the requested scalable media stream to the media client (i.e. media client 504a, 504b, 504c, or 504d). Details of the streaming process will be described in detail in reference to FIG. 7.

Figure 7:
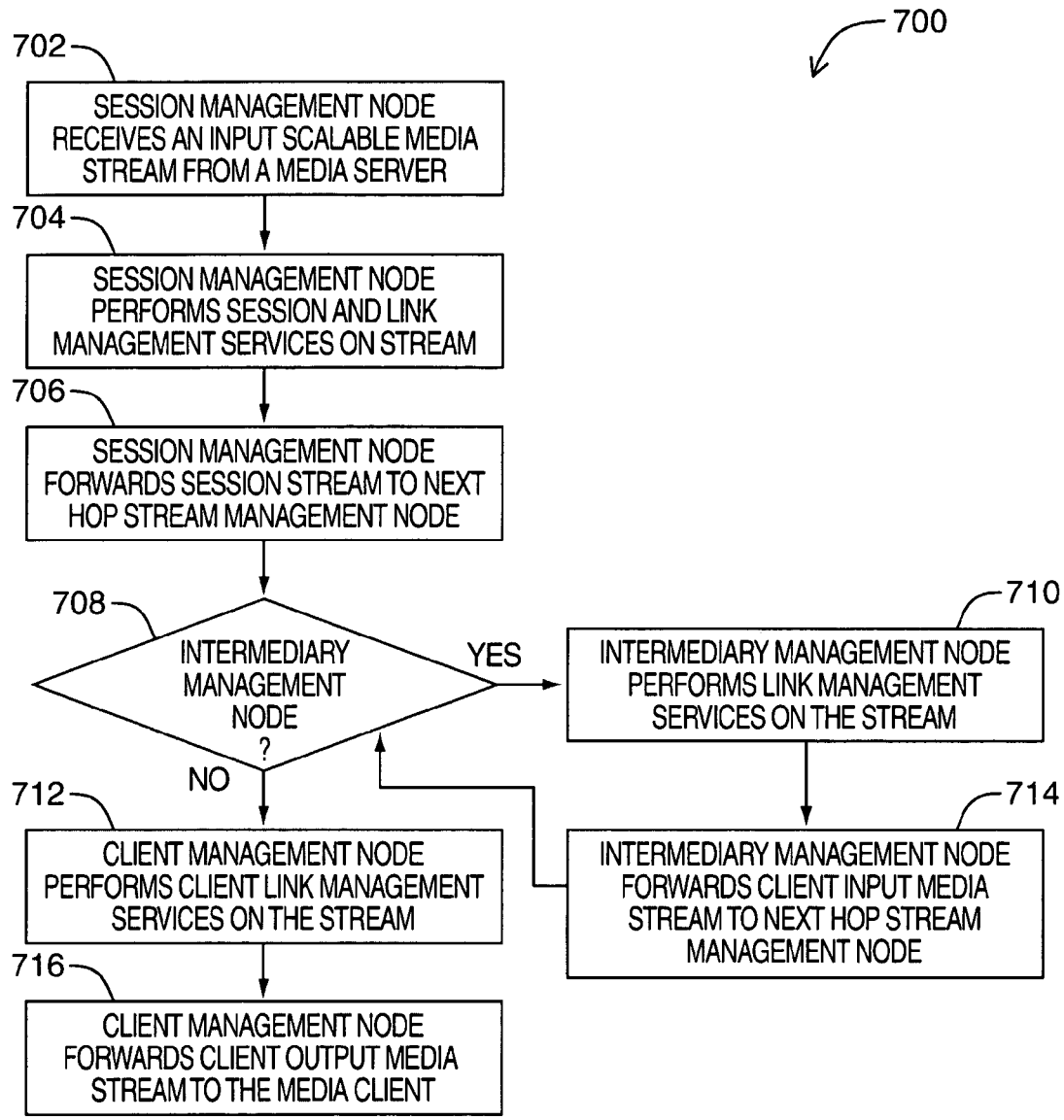
FIG. 7 is a flowchart of a method for streaming a scalable media stream from a media server to a media client in accordance with at least one embodiment.

Reference is now made to FIG. 7 in which a method 700 for streaming a scalable media stream from a media server (i.e. media server 502a or 502b) to a media client (i.e. media client 504a, 504b, 504c, or 504d) in accordance with an embodiment is illustrated. At (702), the session management node (i.e. session management node 508a or 508b) in the path between the media server (i.e. media server 502a or 502b) and a media client (i.e. media client 504a, 504b, 504c, or 504d) receives an input scalable media stream from the media server (i.e. media server 502a or 502b). The method 700 then proceeds to (704).

At (704), the session management node (i.e. session management node 508a or 508b) performs session management services and link management services on the input media stream, and generates a session media stream. As described above, session management services are the thinning and policing services described in reference to FIG. 1 that are most effectively implemented as close to the media server (i.e. media server 502a or 502b) as possible. Session management services typically include steady state thinning which typically includes thinning to achieve the steady state operational point on the matrix.

As described in reference to FIG. 4, link management services are the thinning and policing services that are associated with the network conditions between two adjacent stream management nodes (e.g. between a session management node 508a or 508b and an adjacent intermediary management node 530a, 530b, or 530c). Link management services typically include the dynamic thinning services that can be applied to a group of streams, rather than to an individual stream. For example, the session management node (i.e. session management node 508a or 508b) will typically apply the same dynamic thinning to all scalable media streams being transmitted to the same next stream management node. For example, the session management node (i.e. session management node 508a or 508b) may monitor the packet loss between the session management node and a client management node, and if the packet loss indicates a problem, the stream management node may implement FEC on all the scalable media streams being transmitted to that client management node. Once the session management services and link management services are performed, the method 700 proceeds to (706)

At (706), the session management node (i.e. session management node 508a or 508b) forwards the session management stream to the next stream management node in the path. The method 700 then proceeds to (708).

At (708), the receiving stream management node determines whether it is configured as an intermediary management node (i.e. intermediary management node 530a, 530b, or 530c) or a client management node (i.e. client management node 510a, 510b, 510c, or 510d). If the receiving stream management node is configured as an intermediary management node (i.e. intermediary management node 530a, 530b, or 530c), the method 700 proceeds to (710). If the receiving stream management node is configured as a client management node (i.e. client management node 510a, 510b, 510c or 510d), the method 700 proceeds to (712).

At (710), the intermediary management node (i.e. intermediary management node 530a, 530b, or 530c) performs link management services on the received media stream to generate a client input media stream. As described in reference to FIG. 4, link management services are the thinning and policing services that are associated with the network conditions between two adjacent stream management nodes (e.g. between an intermediary management node 530a, 530b, or 530c and an adjacent client management node 510a, 510b, 510c, 510d). Link management services typically include the dynamic thinning services that can be applied to a group of streams, rather than to an individual stream. For example, the intermediary management node (i.e. intermediary management node 530a, 530b, or 530c) will typically apply the same dynamic thinning to all scalable media streams being sent to the same next stream management node. Once the link management services are performed, the method 700 proceeds to (714).

At (714), the intermediary management node (i.e. intermediary management node 530a, 530b, or 530c) forwards the client input media stream to the next stream management node in the path. The method 700 then proceeds back to (708).

At (712), the client management node (i.e. client management node 510a, 510b, 510c, or 510d) performs client link management services on the client input media stream, and generates a client output media stream. As described above in reference to FIG. 4, client link management services are the thinning and policing services that are most effectively implemented as close to the media client (i.e. media client 504a, 504b, 504c, or 504d) as possible. Client link management services typically include dynamic thinning that is applied to an individual stream or a group of streams. Once the client management node (i.e. client management node 510a, 510b, 510c, or 510d) has performed client link management services on the client input media stream to generate a client output media stream, the method 700 proceeds to (716).

At (716), the client management node (i.e. client management node 510a, 510b, 510c, or 510d) forwards the client output media stream to the media client (i.e. media client 504a, 504b, 504c, or 504d).

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A system for streaming a scalable media stream from a media server to a media client over a network, the scalable media stream encoded in a scalable media format and comprised of a plurality of layers that define a matrix of one or more operational spots for providing one or more resolutions, frame rates or quality levels of the scalable media stream, the system comprising:
  a session management node connected to the network and comprising a first hardware processor, the session management node for:
    receiving the scalable media stream from the media server;
    determining, based on a status of the session management node, a first operational spot on the matrix that defines a first subset of the plurality of layers to be removed by the session management node when the scalable media stream is delivered; and
    performing steady state thinning on the scalable media stream to remove packets associated with the first subset of the plurality of layers in the scalable media stream to produce a session media stream at the first operational spot, the session media stream comprising the remaining layers of the plurality of layers of the scalable media stream; and
  a remote client management node connected to the network and comprising a second hardware processor, the client management node for:
    receiving a client input media stream, the client input media stream being at least a portion of the session media stream;
    determining, based on changes in network conditions between the client management node and the media client, a second operational spot on the matrix that defines a second subset of the plurality of layers to be removed by the client management node when the scalable media stream is delivered;
    performing dynamic thinning on the client input media stream to remove packets associated with the second subset of the plurality of layers to produce a client output media stream; and
    transmitting the client output media stream to the media client;
  wherein the client management node is configured to receive a request for the scalable media stream from the media client, the request from the media client including a URL associated with the scalable media stream,
  wherein the client management node is further configured to select, using a dynamic routing table and the URL associated with the scalable media stream, one of a plurality of intermediary management nodes, each comprising a processor and being situated between the client management node and the session management node; and
  wherein the session management node receives the request from the selected one of the plurality of intermediary management nodes.

2. The system of claim 1, wherein the session management node further performs dynamic thinning on the scalable media stream, the dynamic thinning being responsive to changes in network conditions between the session management node and the client management node.

3. The system of claim 1, wherein the system further comprises the plurality of intermediary management nodes, each comprising a processor and being situated between the client management node and the session management node, for receiving at least a portion of the session media stream and for performing dynamic thinning on the at least a portion of the session media stream to produce the client input media stream, the dynamic thinning being responsive to changes in network conditions between at least one intermediary management node and the client management node.

4. The system of claim 3, wherein the session management node further performs dynamic thinning on the scalable media stream, the dynamic thinning being responsive to changes in network conditions between the session management node and the at least one intermediary management node.

5. The system of claim 3, wherein:
  the client management node transmits the request to the selected intermediary management node;
  the selected intermediary management node receives the request and transmits the request to the session management node; and
  the session management node receives the request from the selected intermediary management node, transmits the request to the media server, and receives the scalable media stream in response to the request.

6. The system of claim 5, wherein the client management node selects the intermediary management node using a preconfigured routing table.

7. The system of claim 6, wherein the request from the media client includes a URL associated with the scalable media stream, and the client management node selects one of the plurality of intermediary management nodes using the preconfigured routing table and the URL associated with the scalable media stream.

8. The system of claim 1, wherein the session management node further acts as a media client when in communication with the media server, and the client management node acts as a media server when in communication with the media client.

9. The system of claim 8, wherein the session management node further acts as an HTTP media client when in communication with the media server, and the client management node acts as an HTTP media server when in communication with the media client.

10. The system of claim 8, wherein the session management node further acts as an RTP/RTSP client when in communication with the media server, and the client management node acts as an RTP/RTSP server when in communication with the media client.

11. The system of claim 1, wherein the client management node performs dynamic thinning and stream policing on the client input media stream to produce the client output media stream.

12. The system of claim 11, wherein stream policing comprises at least one of rate shaping, quality of service, and forward error correction.

13. The system of claim 1, wherein steady state thinning is thinning performed to achieve a steady state operational point, the steady state operational point defining a resolution, frame rate and quality level for the scalable media stream.

14. The system of claim 13, wherein the steady state operational point is based on at least one of
  an initial available network bandwidth between the session management node and the media client;

a resolution, frame rate and quality level specified by the media client;
a profile of the media client; and
a defined set of policies.

15. The system of claim 13, wherein dynamic thinning is thinning performed in response to dynamic feedback received from at least one of the session management node, the client management node, the media client and the network.

16. The system of claim 15, wherein dynamic thinning adjusts the steady state operational spot based on the dynamic feedback received.

17. The system of claim 15, wherein the dynamic feedback indicates an available bandwidth.

18. The system of claim 17, wherein the dynamic feedback comprises at least one RTCP message.

19. A method for streaming a scalable media stream from a media server to a media client over a network, the scalable media stream encoded in a scalable media format and comprised of a plurality of layers for providing one or more resolutions, frame rates or quality levels of the scalable media stream, the method comprising:
  (a) receiving a request from the media client for the scalable media stream at a client management node, wherein the request from the media client includes a URL associated with the scalable media stream;
  (b) transmitting the request from the client management node to a session management node, wherein transmitting the request comprises:
    selecting one of a plurality of intermediary management nodes, wherein the selecting comprises selecting the intermediary management node based on a dynamic routing table and the URL associated with the scalable media stream; and
    transmitting the request from the client management node to the selected intermediary management node;
  (c) receiving the request at the session management node from the selected intermediary management node;
  (d) transmitting the request from the session management node to the media server;
  (e) receiving the scalable media stream at the session management node, in response to the request in (d);
  (f) determining, based on a status of the session management node, a first operational spot on the matrix that defines a first subset of the plurality of layers to be removed by the session management node when the scalable media stream is delivered;
  (q) performing steady state thinning of the scalable media stream to remove packets associated with the first subset of the plurality of layers in the scalable media stream to produce a session media stream at the first operational spot using the session management node, the session media stream comprising the remaining layers of the plurality of layers of the scalable media stream;
  (h) receiving a client input media stream at the client management node, the client input media stream being at least a portion of the session media stream;
  (i) determining, based on changes in network conditions between the client management node and the media client, a second operational spot on the matrix that defines a second subset of the plurality of layers to be removed by the client management node when the scalable media stream is delivered;
  (j) performing dynamic thinning on the client input media stream to remove packets associated with the second subset of the plurality of layers to produce a client output media stream using the client management node; and
  (k) transmitting the client output media stream from the client management node to the media client.

20. The method of claim 19, wherein (g) comprises performing steady state thinning and dynamic thinning of the scalable media stream to produce a session media stream, the dynamic thinning being responsive to changes in network conditions between the session management node and the client management node.

21. The method of claim 19, wherein (b) further comprises:
  receiving the request at the selected intermediary management node; and
  transmitting the request from the selected intermediary management node to the session management node.

22. The method of claim 21, wherein the method further comprises:
  receiving at least a portion of the session media stream at the selected intermediary management node; and
  performing dynamic thinning of the at least a portion of the session media stream to produce the client input media stream, the dynamic thinning being responsive to changes in network conditions between the selected intermediary management node and the client management node.

23. The method of claim 22, wherein (g) comprises performing steady state thinning and dynamic thinning of the scalable media stream to produce the session media stream, the dynamic thinning being responsive to changes in network conditions between the session management node and the selected intermediary management node.

24. The method of claim 21, wherein selecting one of the plurality of intermediary management nodes comprises selecting the intermediary management node based on a preconfigured routing table.

25. The method of claim 24, wherein the request from the media client includes a URL associated with the scalable media stream, and selecting one of the plurality of intermediary management nodes comprises selecting the intermediary management node based on the preconfigured routing table and the URL associated with the scalable media stream.

26. The method of claim 19, wherein the session management node acts as a media client when in communication with the media server, and the client management node acts as a media server when in communication with the media client.

27. The method of claim 26, wherein the session management node acts as an HTTP media client when in communication with the media server, and the client management node acts as an HTTP media server when in communication with the media client.

28. The method of claim 26, wherein the session management node acts as an RTP/RTSP client when in communication with the media server, and the client management node acts as an RTP/RTSP server when in communication with the media client.

29. The method of claim 19, wherein (j) comprises performing dynamic thinning and stream policing on the client input media stream to produce the client output media stream using the client management node.

30. The method of claim 29, wherein stream policing comprises at least one of rate shaping, quality of service, and forward error correction.

31. The method of claim 19, wherein steady state thinning is thinning performed to achieve a steady state operational point, the steady state operational point defining a resolution, frame rate and quality level for the scalable media stream.

32. The method of claim 31, wherein the steady state operational point is based on at least one of an initial available network bandwidth between the session management node and the media client;

a resolution, frame rate and quality level specified by the media client;

a profile of the media client; and a defined set of policies.

33. The method of claim 31, wherein dynamic thinning is thinning performed in response to dynamic feedback received from at least one of the session management node, the client management node, the media client and the network.

34. The method of claim 33, wherein dynamic thinning comprises adjusting the steady state operational spot based on the dynamic feedback received.

35. The method of claim 34, wherein the dynamic feedback indicates an available bandwidth.

36. The method of claim 35, wherein the dynamic feedback comprises at least one RTCP message.

* * * * *